(12) United States Patent
Xu et al.

(10) Patent No.: US 11,520,981 B2
(45) Date of Patent: Dec. 6, 2022

(54) COMPLEX SYSTEM ANOMALY DETECTION BASED ON DISCRETE EVENT SEQUENCES

(71) Applicant: NEC Laboratories America, Inc., Princeton, NJ (US)

(72) Inventors: Jianwu Xu, Titusville, NJ (US); Haifeng Chen, West Windsor, NJ (US); Bin Nie, Williamsburg, VA (US)

(73) Assignee: NEC Corporation

( * ) Notice: Subject to any disclaimer, the term of this patent is extended or adjusted under 35 U.S.C. 154(b) by 493 days.

(21) Appl. No.: 16/787,774

(22) Filed: Feb. 11, 2020

(65) Prior Publication Data

US 2020/0285807 A1 Sep. 10, 2020

Related U.S. Application Data

(60) Provisional application No. 62/814,888, filed on Mar. 7, 2019.

(51) Int. Cl.
*G06F 11/27* (2006.01)
*G06F 40/20* (2020.01)
(Continued)

(52) U.S. Cl.
CPC ............. *G06F 40/20* (2020.01); *G06N 3/04* (2013.01); *G06N 3/063* (2013.01); *G06F 2221/033* (2013.01)

(58) Field of Classification Search
CPC ..... G06F 40/20; G06F 2221/033; G06N 3/04; G06N 3/063
See application file for complete search history.

(56) References Cited

U.S. PATENT DOCUMENTS

2007/0209074 A1* 9/2007 Coffman ............... G06F 21/552
 709/224
2010/0182200 A1* 7/2010 Finney .................. G01S 5/0221
 342/393

(Continued)

OTHER PUBLICATIONS

Das et al., "Anomaly Pattern Detection in Categorical Datasets", KDD'08, Aug. 2008, pp. 169-176.

(Continued)

*Primary Examiner* — Hang Pan
(74) *Attorney, Agent, or Firm* — Joseph Kolodka

(57) ABSTRACT

A method detects anomalies in a system having sensors for collecting multivariate sensor data including discrete event sequences. The method determines, using a NMT model, pairwise relationships among the sensors based on the data. The method forms sequences of characters into sentences on a per sensor basis, by treating each discrete variable in the sequences as a character in natural language. The method translates, using the NMT, the sentences of source sensors to sentences of target sensors to obtain a translation score that quantifies a pairwise relationship strength therebetween. The method aggregates the pairwise relationships into a multivariate relationship graph having nodes representing sensors and edges denoted by the translation score for a sensor pair connected thereto to represent the pairwise relationship strength therebetween. The method performs a corrective action to correct an anomaly responsive to a detection of the anomaly relating to the sensor pair.

20 Claims, 7 Drawing Sheets

(51) Int. Cl.
  *G06N 3/04*   (2006.01)
  *G06N 3/063*  (2006.01)

(56) References Cited

U.S. PATENT DOCUMENTS

| | | | | |
|---|---|---|---|---|
| 2017/0139806 | A1* | 5/2017 | Xu | G06F 11/0766 |
| 2017/0322120 | A1* | 11/2017 | Wang | G01M 99/005 |
| 2018/0268264 | A1* | 9/2018 | Marwah | G01D 21/00 |
| 2021/0133251 | A1* | 5/2021 | Tiwari | G06F 16/345 |

OTHER PUBLICATIONS

Dong et al., "Efficient Mining of Emerging Patterns: Discovering Trends and Differences", D '99 Proceedings of the fifth ACM SIGKDD, Aug. 1999, pp. 43-52.

Luo et al., "Multi-Task Multi-Dimensional Hawkes Processes for Modeling Event Sequences", Proceedings of the Twenty-Fourth International Joint Conference on Artificial Intelligence (IJCAI) Jul. 2015, pp. 3685-3691.

Wong et al., "Rule-Based Anomaly Pattern Detection for Detecting Disease Outbreaks", AAAI-02 Proceedings 2002, pp. 217-223.

Papineni et al., "BLEU: a Method for Automatic Evaluation of Machine Translation", Proceedings of the 40th Annual Meeting of the Association for Computational Linguistics (ACL), Jul. 2002, pp. 311-318.

Rozenshtein et al., "Event detection in activity networks", KDD '14 Proceedings of the 20th ACM SIGKDD international conference on Knowledge discovery and data mining, Aug. 2014, pp. 1176-1185.

Speakman et al., "Fast Generalized Subset Scan for Anomalous Pattern Detection", Journal of Machine Learning Research 14 (2013), Jun. 2013, pp. 1533-1561.

Sutskever et al., "Sequence to Sequence Learning with Neural Networks", ARXIV.org, Sep. 2014, pp. 1-9.

Luong et al., "Neural Machine Translation (seq2seq) Tutorial", GitHub—tensorflow/nmt: TensorFlow Neural Machine Translation Tutorial, May 2017, 21 pages.

* cited by examiner

COMPLEX SYSTEM ANOMALY DETECTION BASED ON DISCRETE EVENT SEQUENCES

RELATED APPLICATION INFORMATION

This application claims priority to U.S. Provisional Patent Application No. 62/814,888, filed on Mar. 7, 2019, incorporated herein by reference herein its entirety.

BACKGROUND

Technical Field

The present invention relates to anomaly detection and more particularly to complex system anomaly detection based on discrete event sequences.

Description of the Related Art

Learning from system measurements is to understand the joint behavior of different system components. However, the fact that different sensors can record system states in different formats introduces a challenge. Depending on the nature of the measured unit, the system states recorded by different sensors can be in the format of either continuous time series (i.e., consisting of numerical variables) or discrete event time sequences. Given the huge amount of sensor time sequences, it is not feasible, if not possible, for system administrators to automatically discover any system anomaly. Hence, there is a need for an automated approach to system anomaly detection.

SUMMARY

According to an aspect of the present invention, a computer-implemented method is provided for automatic anomaly detection in a physical hardware system having a plurality of sensors. The method includes determining, by a hardware processor using a Neural Machine Translation (NMT) model, pairwise relationships among the plurality of sensors based on the multivariate sensor data including discrete event sequences obtained from the plurality of sensors. The method further includes forming sequences of characters into sentences on a per sensor basis, by treating each discrete variable in the discrete event sequences as a character in natural language. The method also includes translating, using the NMT, the sentences of source sensors, from among the plurality of sensors, to sentences of target sensors, from among the plurality of sensors, to obtain a translation score that quantifies a pairwise relationship strength therebetween. The method additionally includes aggregating the pairwise relationships into a multivariate relationship graph having nodes representing respective ones of the plurality of sensors and edges denoted by the translation score for a sensor pair connected thereto to represent the pairwise relationship strength therebetween. The method further includes performing a corrective action to correct an anomaly responsive to a detection of the anomaly relating to the sensor pair based on a detected violation of the pairwise relationship strength therebetween determined using the multivariate relationship graph relative to input testing multivariate sensor data.

According to another aspect of the present invention, a computer program product is provided for automatic anomaly detection in a physical hardware system having a plurality of sensors. The computer program product includes a non-transitory computer readable storage medium having program instructions embodied therewith. The program instructions are executable by a computer to cause the computer to perform a method. The method includes determining, using a Neural Machine Translation (NMT) model, pairwise relationships among the plurality of sensors based on the multivariate sensor data including discrete event sequences obtained from the plurality of sensors. The method further includes forming, by the hardware processor, sequences of characters into sentences on a per sensor basis, by treating each discrete variable in the discrete event sequences as a character in natural language. The method also includes translating, using the NMT, the sentences of source sensors, from among the plurality of sensors, to sentences of target sensors, from among the plurality of sensors, to obtain a translation score that quantifies a pairwise relationship strength therebetween. The method additionally includes aggregating the pairwise relationships into a multivariate relationship graph having nodes representing respective ones of the plurality of sensors and edges denoted by the translation score for a sensor pair connected thereto to represent the pairwise relationship strength therebetween. The method further includes performing a corrective action to correct an anomaly responsive to a detection of the anomaly relating to the sensor pair based on a detected violation of the pairwise relationship strength therebetween determined using the multivariate relationship graph relative to input testing multivariate sensor data.

According to yet another aspect of the present invention, a computer processing system is provided for automatic anomaly detection in a physical hardware system having a plurality of sensors for collecting multivariate sensor data including discrete event sequences. The computer processing system includes a memory device including program code stored thereon. The computer processing system further includes a hardware processor, operatively coupled to the memory device, and configured to run the program code stored on the memory device to determine, using a Neural Machine Translation (NMT) model, pairwise relationships among the plurality of sensors based on the multivariate sensor data. The hardware process further runs the program code to form sequences of characters into sentences on a per sensor basis, by treating each discrete variable in the discrete event sequences as a character in natural language. The hardware processor also runs the program code to translate, using the NMT, the sentences of source sensors, from among the plurality of sensors, to sentences of target sensors, from among the plurality of sensors, to obtain a translation score that quantifies a pairwise relationship strength therebetween. The hardware processor additionally runs the program code to aggregate the pairwise relationships into a multivariate relationship graph having nodes representing respective ones of the plurality of sensors and edges denoted by the translation score for a sensor pair connected thereto to represent the pairwise relationship strength therebetween. The hardware processor further runs the program code to perform a corrective action to correct an anomaly responsive to a detection of the anomaly relating to the sensor pair based on a detected violation of the pairwise relationship strength therebetween determined using the multivariate relationship graph relative to input testing multivariate sensor data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
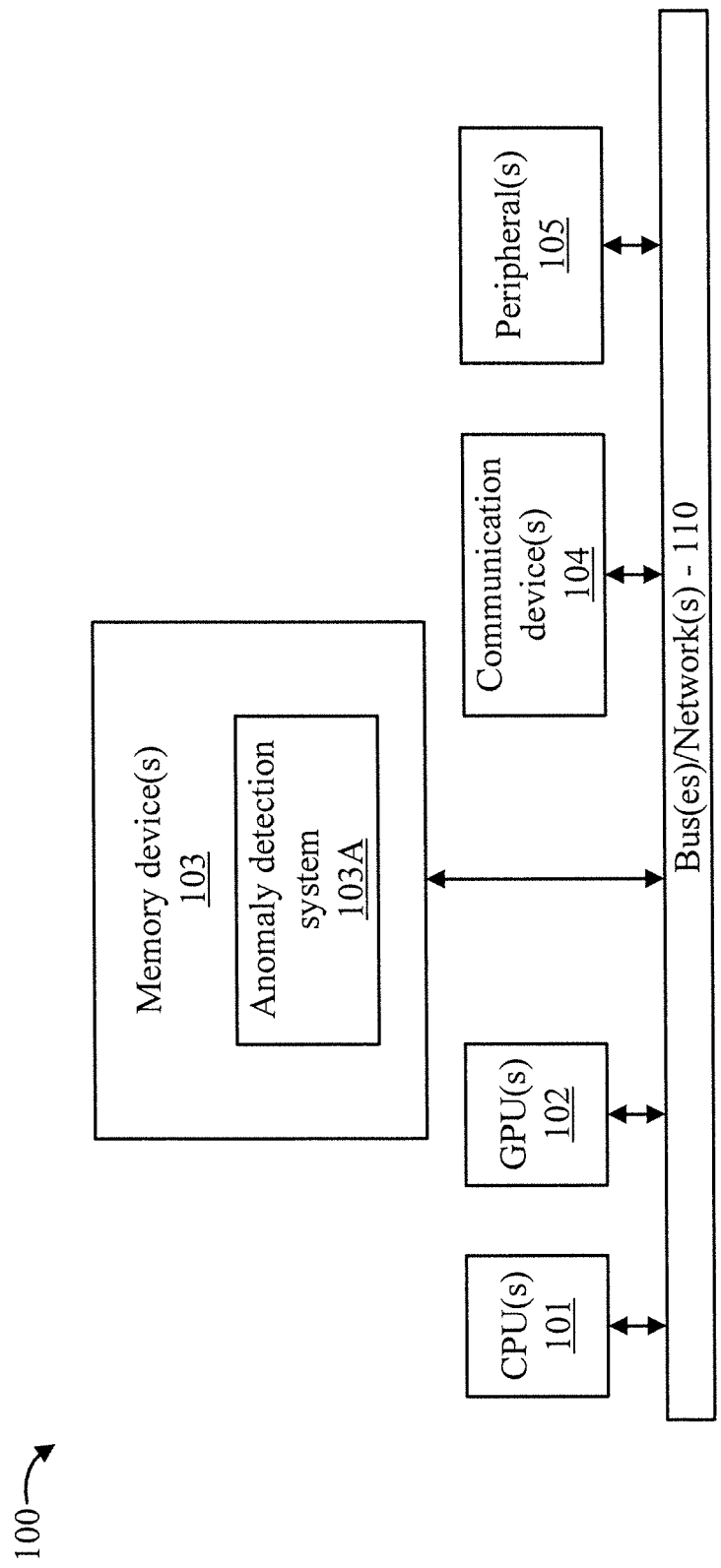
FIG. 1 is a block diagram showing an exemplary processing system, in accordance with an embodiment of the present invention.

Embodiments of the present invention are directed to complex system anomaly detection based on discrete event sequences.

One or more embodiments of the present invention provide a method for automatic anomaly detection in a complex physical or information system based on discrete event sequences. The discrete event sequences are collected from sensors. The sensors can be in, for example, a power plant or physical plant or some other type of structure. In an embodiment, the present invention constructs a comprehensive pairwise inter-dependence and inter-correlation model using the multivariate sensor data in relation to the system operating in a normal situation. In an embodiment, the present invention uses a Neural Machine Translation (NMT) model to quantify the pairwise relationship among sensors with discrete event sequences. Each discrete variable in discrete event sequences can be treated as a character in natural language (i.e., English contains 26 characters). Then, by carefully portioning sequences of characters into words and sentences, an embodiment of the present invention can utilize the NMT model to translate sentences of a source sensor to sentences of a target sensor, similar to translation from a source language to a target language in natural language translation. By using the same parameter settings to train the NMT model among each sensor pair in the system, we can use the training score to quantify the strength of the relationship between the source and target sensors. A higher score implies a stronger relationship between two sensors in the pair while a lower score implies a weaker relationship. With the quantified invariant relationship between sensors, we can then generate a sensor relationship network by treating nodes as sensors and edges as relationships. The model is deployed to monitor system status. If the pairwise relationship is violated for any testing sensor sequences, then a system anomaly is detected and administrators are alerted. Also, an anomaly corrective or bypassing action can be performed for any detected anomalies.

Thus, in an embodiment, the present invention proposes an analytics framework that is specially designed for discrete event sequences collected from sensors in real-world systems for anomaly detection. During the training phase, the framework extracts the pairwise relationships among discrete event sequences of sensors by applying a neural machine translation model. Each discrete event sequence of a sensor is considered as a "natural language". The relationship between sensors is quantified by how well one discrete event sequence of a sensor is "translated" into the other, i.e., by using the translation score. The pairwise relationships among sensors are then aggregated into a relationship graph (called a multivariate relationship graph) which clusters the structural knowledge of the underlying system. During the testing phase, if one or more pairwise relationships are violated, a system anomaly is detected. The anomaly can be further traced through the multivariate relationship graph to determine its potential root cause. These and other aspects of the present invention are described hereinbelow.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 include an anomaly detection system 103A. In another embodiment, the computer processing system 100 is part of a complex system to be monitored.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
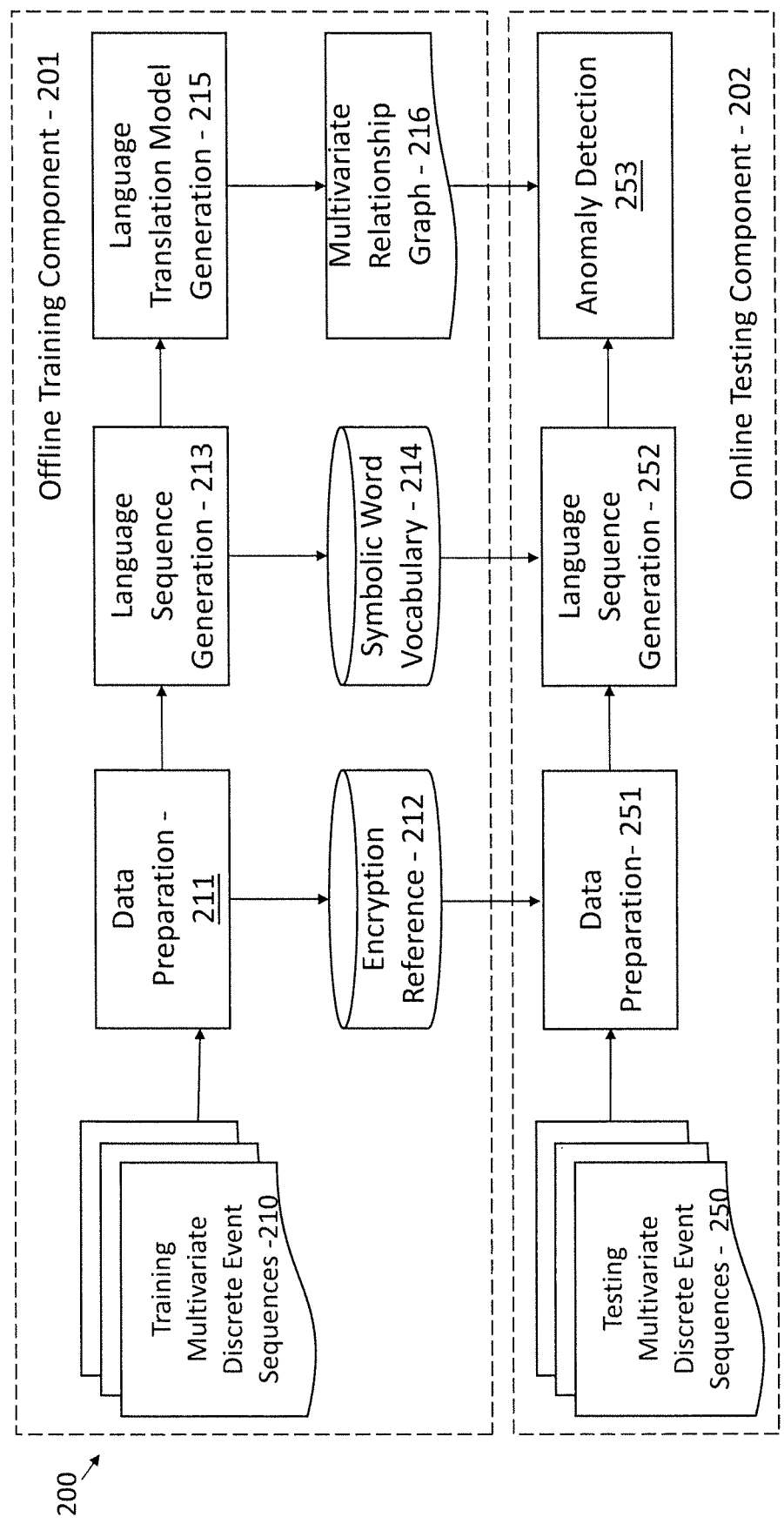
FIG. 2 is a high-level block diagram showing an exemplary system/method for complex system anomaly detection based on discrete event sequences, in accordance with an embodiment of the present invention.

FIG. 2 is a high-level block diagram showing an exemplary system/method 200 for complex system anomaly detection based on discrete event sequences, in accordance with an embodiment of the present invention.

The system/method 200 includes an offline training portion 201 and an online testing portion 202.

The offline training portion 201 includes the following: training multivariate discrete event sequences 210; a data preparation component 211; an encryption reference database component 212; a language sequence generation component 213; a symbolic word vocabulary database component 214; a language translation model generation component 215; and a multivariate relationship graph 216.

The online testing portion 202 includes testing multivariate discrete event sequences 250, a data preparation component 251, a language sequence generation component 252, and anomaly detection and correction component 253.

The training multivariate discrete sequences 210 are collected during normal system operation in order to construct the pairwise relationships among sensors. Given a set of training multivariate discrete event sequences 210, the data preparation component 211 and the language sequences generation component 213 preprocesses the event sequences 210 to filter out non-representative ones, encrypt the discrete event sequences 210 into characters and organize the sequences of characters into sequences of words and sentences. This step transforms the multivariate discrete event sequences 210 into multi-lingual sensor "languages". Then, the language translation model generation component 215 uses the neural machine translation (NMT) model to build the pairwise relationship for each pair of sensors. The collection of all pairwise relationships from all sensors forms the multivariate relationship graph 216, which visualizes the relationship between (any) two sensors. The weights of the edges that connect the sensors describe the logic or physical relationship between the sensors. In addition, the connections offer causality perspectives for fault diagnosis and root cause identification. The multivariate relationship graph 216 becomes the model generated from the offline training portion 201 and will be used to monitor system status and detect anomalies in the online testing portion 202.

A further description will now be given regarding the training multivariate discrete event sequences 210, in accordance with an embodiment of the present invention.

The model training data is a set of collected discrete event sequences 210 corresponding to the output of many sensors deployed in, for example, but not limited to, a physical power or a chemical plant. Each point in an event sequence includes a time stamp and an event record. The event record tells the sensor status at a specific time stamp. The collected discrete time sequences 210 can be long or short dependent on the collection duration. The discrete time sequences 210 might have some missing values at some time stamps due to sensor malfunction or other reasons. In an embodiment, the missing time points can be discarded.

Figure 3:
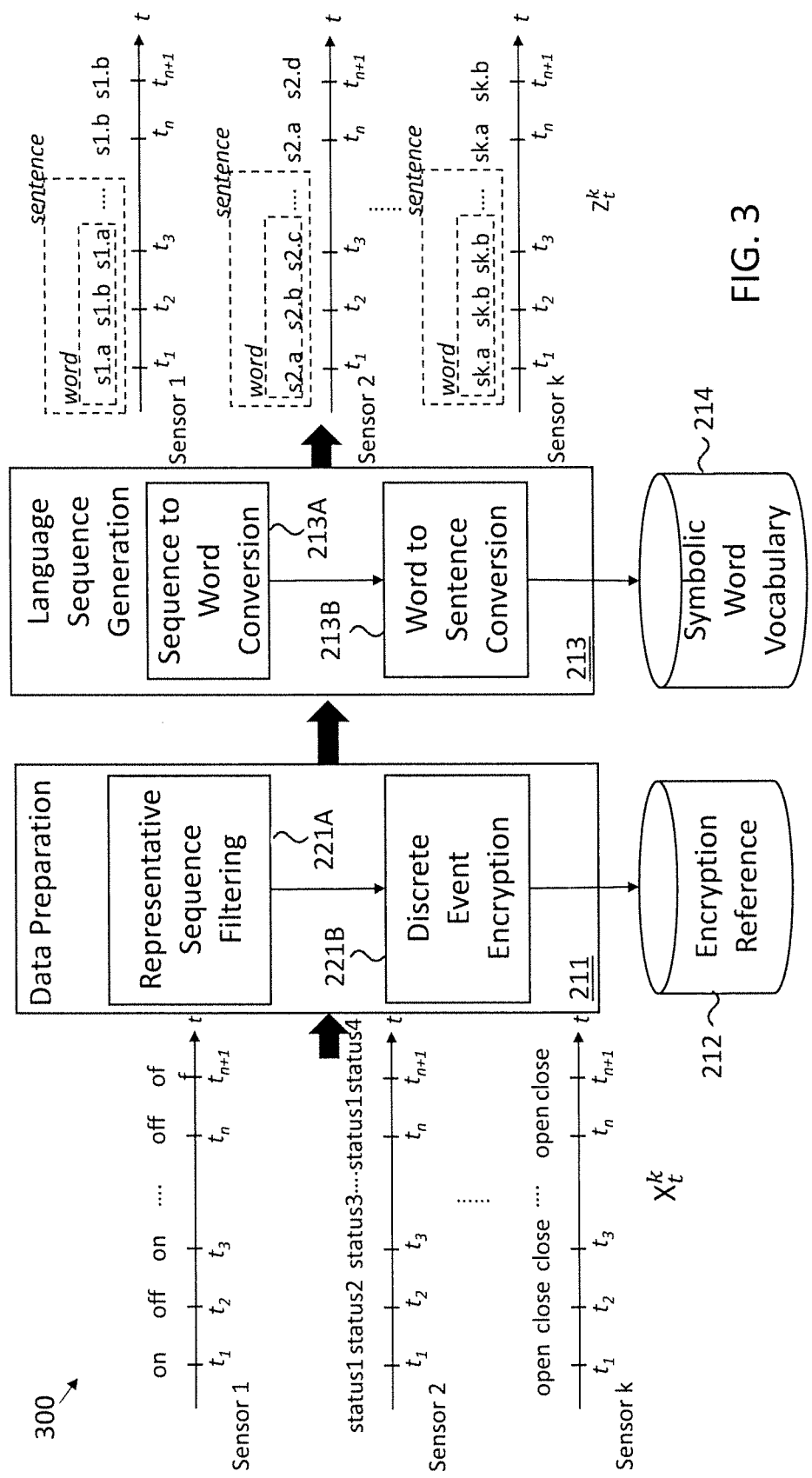
FIG. 3 is a block diagram showing a schema of various components of the system/method of FIG. 2, in accordance with an embodiment of the present invention.

FIG. 3 is a block diagram showing a schema 300 of various components of the system/method 200 of FIG. 2, in accordance with an embodiment of the present invention. The schema 300 relates to the data preparation component 211, the encryption reference component 212, the language sequence generation component 213, and the symbolic word vocabulary component 214. The discrete time sequences 210 are transformed by the data preparation component 211 $\{x_t^k\}$ and the language sequence generation component 213 into multi-sensor language sequences $\{z_t^k\}$.

A further description will now be given of the data preparation component 211, in accordance with an embodiment of the present invention.

The data preparation component 211 prepares the multivariate discrete event sequences 210 in the format that meets a pre-specified input requirement. The input of the data preparation component 211 is the large corpus of multivariate discrete event sequences 210.

The data preparation component 211 includes a representative sequence filtering component 211A and a discrete event encryption component 211B.

A further description will now be given of the representative sequence filtering component 211A of the data preparation component 211, in accordance with an embodiment of the present invention.

A first step performed by the representative sequence filtering component 211A weeds out some meaningless event sequences. For example, if all events in a sequence are identical during the entire sampling period, then this sequence cannot provide any contribution to the language translation model generation component 215. In an embodiment, sequence or sequence portions with constant events can be excluded (discarded).

A further description will now be given of the discrete event encryption component 211B of the data preparation component 211, in accordance with an embodiment of the present invention.

For the remaining discrete event sequences, each event record is encrypted into characters. For each discrete event sequence, the unique set of event records are collected and then sorted in alphanumeric order. Then, letters are assigned to each unique event record. To differentiate multiple sequences, we can prefix the sensor TO name in front of the character. For example, the event record "on" in the sequence of sensor 1 is coded as "s 1.*a*". The purpose of encryption is to map the event record into an alphabet so that the transformed sequence becomes a sensor language.

The preceding description of the data preparation component 211 of the training portion 201 also applies to the data preparation component 251 of the testing portion 202.

A further description will now be given of the encryption reference database component 212, in accordance with an embodiment of the present invention.

The encryption reference database component 212 includes the mapping between any of sensor discrete sequence value and the transformed character. The purpose of encryption is to map the sensor record into a set of alphabet so that the transformed sequence becomes an artificial sensor language.

A further description will now be given of the language sequence generation component 213, in accordance with an embodiment of the present invention.

Once the encoded characters are obtained for each event record, the language sequence generation component 213 groups the characters into words and sentences in order to leverage the existing neural machine translation (NMT) method to translate the sentences from one sensor to another, similar to natural language translation.

The language sequence generation component 213 includes a sequence to word conversion component 213A and a word to sentence conversion component 213B.

A further description will now be given of the sequence to word conversion component 213A of the language sequence generation component 213, in accordance with an embodiment of the present invention.

"Words" of equal length of i characters are composed. Using a sliding window of j characters, the next word is generated. For example, if j=1, then we use the first i characters of the sequence to compose the first word, the second to the i+1 characters to compose the second word, and the third to the i+2 characters to compose the third word, etc. The distinct set of words derived by each sensor is the sensor vocabulary.

A further description will now be given of the word to sentence conversion component 213B of the language sequence generation component 213, in accordance with an embodiment of the present invention.

Once the sequence to word conversion component 213A obtains sequences of words for all sensors, the next step is to generate sentences so that the discrete event sequence of each sensor transforms into a sensor "language" that can be used in the NMT method. Similarly, we group words into sentences of equal length by setting the length of one sentence to m words with a sliding window of n words. For m=20 and n=20, the first 20 words are used to compose the first sentence, the next 20 words are used to compose the second sentence, and so forth. For every sensor, we perform the conversion from sequences of words to sequences of sentences.

The preceding description of the language sequence generation component 213 of the training portion 201 also applies to the language sequence generation component 252 of the testing portion 202.

A further description will now be given of the symbolic word vocabulary component 214, in accordance with an embodiment of the present invention The symbolic word vocabulary component 214 stores the sensor symbolic word vocabulary generated from the language sequence generation component 213. It will be used as one of the inputs to the language translation model generation component 215. The vocabulary is in a plain text file format.

Figure 4:
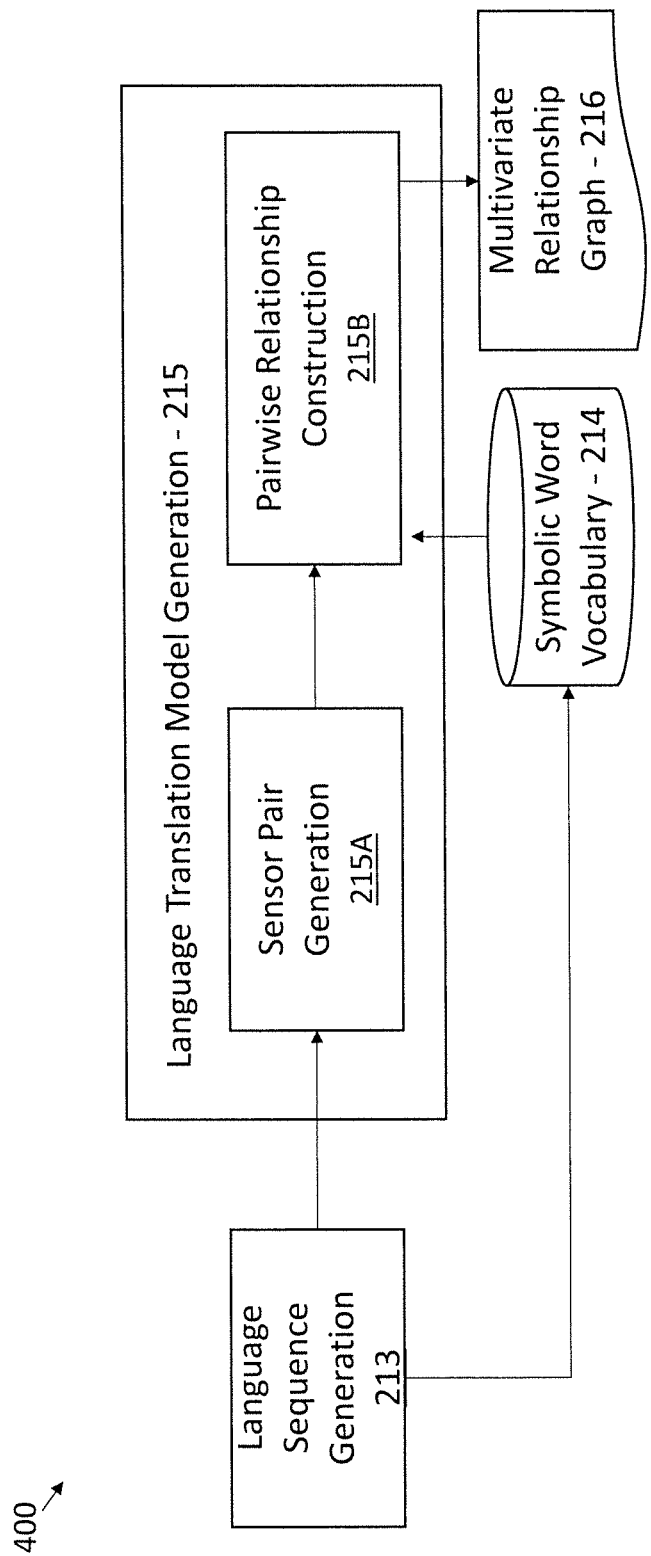
FIG. 4 is a block diagram further showing the language translation model generation component of FIG. 2 in relation to other components of FIG. 2, in accordance with an embodiment of the present invention.

A further description will now be given of the language translation model generation component 215, in accordance with an embodiment of the present invention FIG. 4 is a block diagram further showing the language translation model generation component 215 of FIG. 2 in relation to other components of FIG. 2, in accordance with an embodiment of the present invention.

The language translation model generation component 215 takes the output from the language sequence generation component 213, which are essentially sentences of all sensors in the system, and builds the multivariate relationship graph 216 using a Neural Machine Translation (NMT) model. The generated multivariate relationship graph 216 presents sensor pairwise relationships of different strength in the system and will be used by the online testing portion 202. The language translation model generation component 215 includes a sensor pair generation component 215A and a pairwise relationship construction component 215B. First of all, the sensor pair generation component 215A further filters out unnecessary sensors and prepares a list of sensor pairs for the pairwise relationship construction component 215B. Secondly, the pairwise relationship construction component 215B builds a NMT model for each pair of sensors in the system and generates the multivariate relationship graph 216.

A further description will now be given of the sensor pair generation component 215A of the language translation model generation component 215, in accordance with an embodiment of the present invention.

A first step is to generate a set of sensor pairs that will be trained in a next step. Note that the relationship built by the translation model is directed. In other words, translating sentences of sensor x to sentences of sensor y is treated as a different pairwise relationship from translating sentences of sensor y to sentences of sensor x. Therefore, suppose there are n sensors in the systems, it will result in n(n−1) sensor pairs. Considering the number of sensors in real-world systems could be in hundreds or even thousands, it is impossible to build a translation model for every sensor pair. Therefore, the data preparation component 211 performs the first-order of reduction in the number of sensors. Here, the following methods are proposed to future reduce the number of sensor pairs:

1. Heuristically, we find sensors with no or very few variable state changes provide little to no indications towards building effective invariant relationships. Therefore, we further remove those sensors that are mostly constant (i.e., no state change) in the majority of sampling periods and occasionally encounter state changes (i.e., spikes) in only a few (less than a threshold number) timestamps.

2. The event sequences of some sensors can be very similar such that their similarity can be easily detected with naïve comparison methods. For example, they may all utilize the same set of variables and exhibit same variable transitions at the same timestamps. We consider those sensors highly similar to each other. For sensors sharing high similarity, in an embodiment, only one representative sensor is picked and the rest are discarded.

After filtering out some redundant sensors, we then pass the list of remaining sensor pairs to the pairwise relationship construction component 215B.

A further description will now be given of the pairwise relationship construction component 215B of the language translation model generation component 215, in accordance with an embodiment of the present invention.

Figure 5:
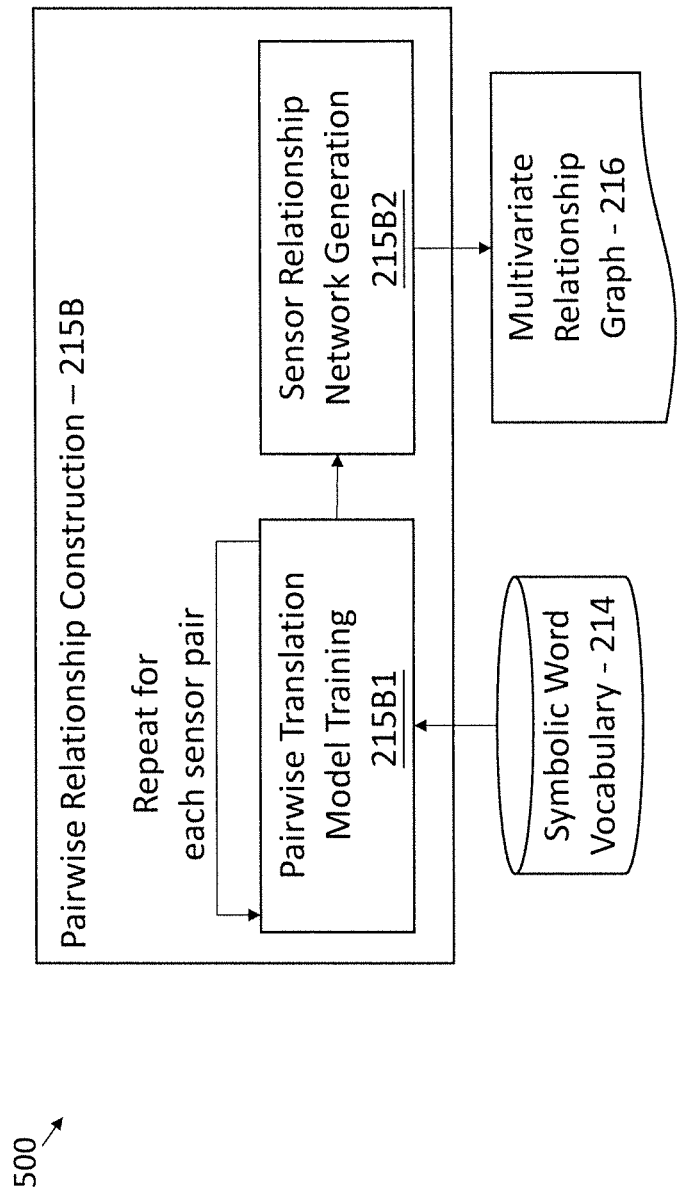
FIG. 5 is a block diagram further showing the pairwise relationship construction component of FIG. 4 in relation to other elements of FIG. 2, in accordance with an embodiment of the present invention.

FIG. 5 is a block diagram further showing the pairwise relationship construction component 215B of FIG. 4 in relation to other elements of FIG. 2, in accordance with an embodiment of the present invention.

The pairwise relationship construction component 215B includes a pairwise translation model training component 215B1 and a sensor relationship network generation component 215B2.

For each pair of sensors given by the previous the sensor pair generation component 215A, we build a Neural Machine Translation (NMT) model to quantify the strength of the invariant relationship between the source and target sensors, which corresponds to the pairwise translation model training component 215B1.

A further description will now be given of the pairwise translation model training component 215B1 of the pairwise relationship construction component 215B, in accordance with an embodiment of the present invention.

Figure 6:
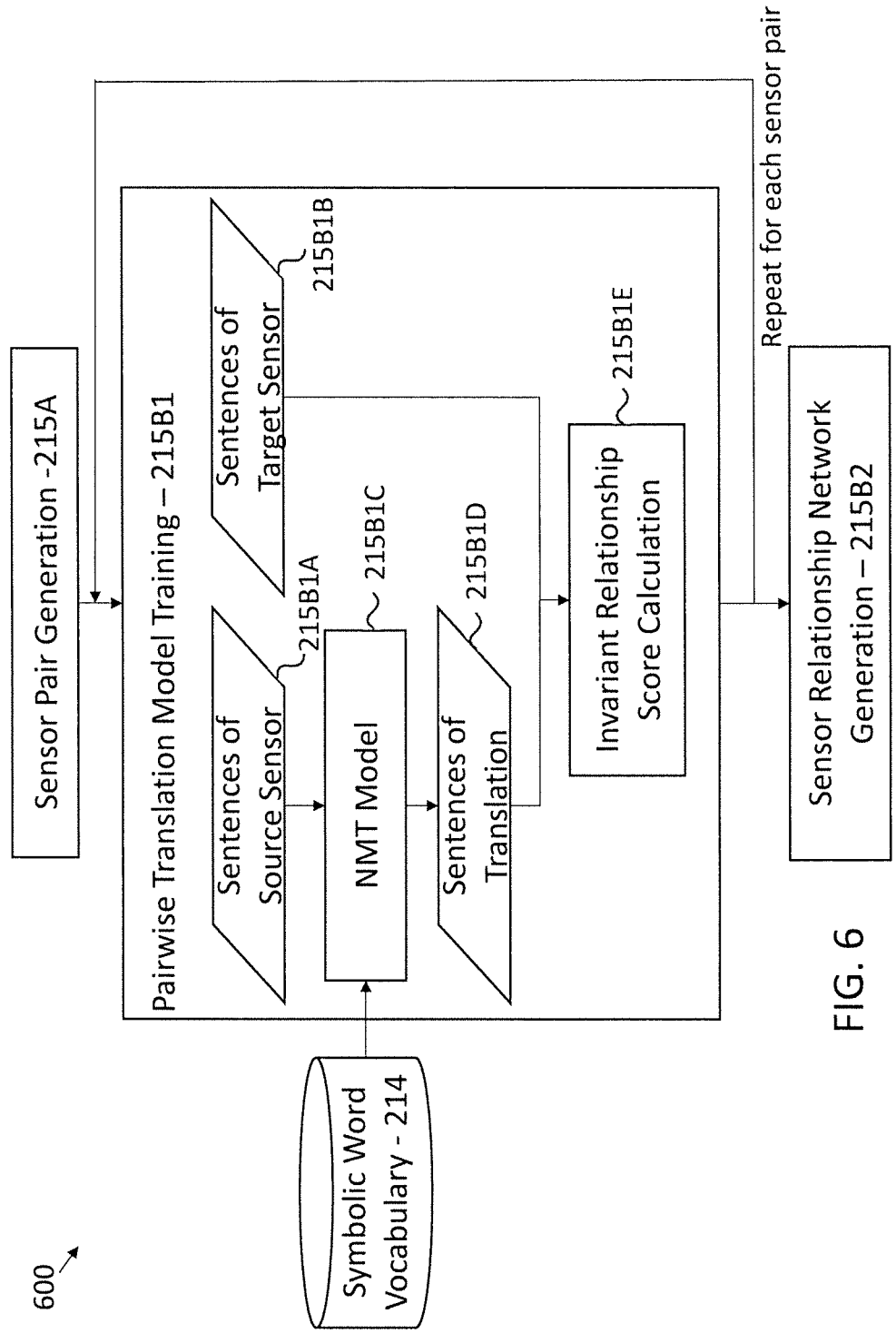
FIG. 6 is a block diagram further showing the pairwise translation model training component of FIG. 5 in relation to other elements of FIGS. 2 and 5, in accordance with an embodiment of the present invention.

FIG. 6 is a block diagram further showing the pairwise translation model training component 215B1 of FIG. 5 in relation to other elements of FIGS. 2 and 5, in accordance with an embodiment of the present invention. The pairwise translation model training component 215B1 is repeated for each sensor pair.

The pairwise translation model training component 215B1 includes sentences of a source sensor 215B1A, sentences of a target sensor 215B1B, a NMT model 215B1C, sentences of translation 215B1D, and an invariant relationship score calculation component 215B 1E.

The pairwise translation model training component 215B1 is essentially a training process of building a sequence-to-sequence (seq2seq) model. We first translate the sentences of source sensor 215B1A using the NMT model 215B1C and then compare the translated sentences 215B1D with the sentences of target sensor 215B1B in the invariant relationship score calculation component 215B1E and calculate a score to quantify the strength of invariant relationship between the source and target sensors. The calculated scores of all sensor pairs are then passed to sensor relationship network generation component 215B2.

A further description will now be given of the NMT model 215B1C of the pairwise translation model training component 215B1, in accordance with an embodiment of the present invention.

Seq2seq models have been vastly used in building effective neural machine translation systems for human language translation tasks. The NMT model 215B1C used in the present invention is a classic seq2seq model using LSTM unit and attention mechanism, implemented using Tensor-Flow. Given the sentences of the source sensor, the NMT model 215B1C takes the symbolic word vocabulary component 214 generated in the language sequence generation component 213 to generate word embeddings and then perform translation sentence by sentence.

A further description will now be given of the invariant relationship score calculation component 215B1E of the pairwise translation model training component 215B1, in accordance with an embodiment of the present invention.

The invariant relationship score calculation component 215B1E compares the translated sentences 215B1D and the sentences of the target sensor 215B1B and calculates an invariant relationship score to quantify the strength the pairwise relationship of the source and target sensors. A quantification score that can be used is BiLingual Evaluation Understudy (BLEU) score. This score is the most commonly used metric to quantitively compare the machine translation with human translated references. Its major advance is its efficiency in computing the score without any human involvement. The score ranges from 0 to 100, the higher the better. Of course, other types of scores can also be used. The goal of using the NMT model 215B 1C here is to quantify the invariant relationship between sensor pairs and provide a meaningful score to evaluate the strength of invariant relationship. Therefore, the definition of a "good" model with respect to the present invention is different from the common and intuitive concept, i.e., a powerful model that can capture irregular situations in the source sentences and provide translation as perfect as possible. In embodiments of the present invention, we prioritize the ability of distinguishing strong and weak relationships over the ability of translation. Consequently, we prefer a simple and shallow network model over a complex and deep network model and use the same parameter settings to train the NMT model 215B1C for all sensor pairs. Only in this way, the calculated scores are comparable across different sensor pairs.

A further description will now be given of the sensor relationship network generation component 215B2 of the pairwise relationship construction component 215B, in accordance with an embodiment of the present invention.

The sensor relationship network generation component 215B2 collects the invariant relationship score from all sensor pairs in the system and classifies those scores into three categories, which are Strong, Medium, and Weak connections. For each type of connection, we can build a sensor relationship network (multivariate relationship graph 216. In the sensor relationship network, a node represents a sensor, a directed edge between nodes represents the translation from one sensor to another, and the weight of the edge is obviously the invariant relationship score given the NMT model 215B1C trained on the source and target sensors.

A further description will now be given of the multivariate relationship graph 216, in accordance with an embodiment of the present invention The output of language translation model generation component 215 is the sensor relationship network. In the network graph 216, each node represents a sensor (e.g., from a physical power or chemical plant) and each edge between two sensors means there is interdependence between these two sensors. The interdependence relationship could be originated from the same physical component or similar functionality. The sensor relationship network graph is presented in a graphical interface so that system administrators can easily navigate the clustering structure of the sensor relationship. The connection among different sensors generates clustering structure. A set of sensors can form a group with strong connections within the group but weak or no connections across to other sensors. This group of sensors can correspond to the same physical component or same functionality.

A further description will now be given regarding online testing, in accordance with an embodiment of the present invention.

The online testing portion 202 includes the same data preparation 251 and language sequence generation component 252 to transform the testing multivariate discrete event sequences 250 into sensor "languages". The converted "language" sequences are applied to the language translation model constructed from the training phase to detect system anomalies. The anomaly detection and correction component 253 computes the aggregated language translation model violations as a function of the anomaly score. If the anomaly score exceeds a certain threshold, then system anomaly is detected and administrators are alerted and corrective action is applied/performed.

A further description will now be given of the testing multivariate discrete event sequences 250, in accordance with an embodiment of the present invention.

The testing multivariate discrete event sequences 250 are in the same format as the training sequences 210. The testing sequences 250 will undergo the same data preparation 211 and language sequence generation 213 procedures as in the training portion 201 in order to produce the required "language" sequences for the testing portion 202.

A further description will now be given of the anomaly detection and correction component 253, in accordance with an embodiment of the present invention.

Once the offline training model is generated, we apply it to online anomaly detection for any testing multivariate discrete event sequences. Algorithm 1 presents the main steps for system anomaly detection.

TABLE 1 is a diagram showing an exemplary algorithm 700 for anomaly detection, in accordance with an embodiment of the present invention.

---
Algorithm 1 - Anomaly Detection
---
Input Multivariate Testing Language Sequence $\{Y_t^k, k \in N\}$,
    Multivariate Relationship Graph
Output: System Anomaly Score $\{a_t, t \in T\}$,
    Sensor Pair Alert Status $\{W_t, t \in T\}$
for t in T do
    $a_t \leftarrow 0, p_t \leftarrow 0, W_t \leftarrow 0$,
    for $\{Y_t^i, Y_t^j\} \in Y_t^k, i \neq j \in N$ do
        if directional NMT model g(i, j) is a valid model then
            $P_t \leftarrow P_t + 1$
            f (i, j) < s(i, j) then
            $a_t \leftarrow a_t + 1$
            $W_t(i, j) \leftarrow 1$
    $a_t \leftarrow a_t/p_t$
return $a_t, W_t$
---

The anomaly detection is performed at each time stamp t where the directional NMT model is applied to the sensor pair (i, j) between the source and target language sentences if the NMT model g(i, j) is a valid one. The validity of NMT model g(i, j) is determined by the range of BLEU score s(i, j) set by users 1. A language translation model g(i, j) is broken if the testing BLEU score f(i, j) is smaller than the BLEU score s(i, j) obtained in training. In other words, the component finds a broken relationship between sensor pair (i, j) at time stamp t. The anomaly score $a_t$ is computed as the total number of broken relationships normalized by the total number of valid models (i.e., $p_t$). The sensor pair alert status $\{Wt, t \in T\}$ is a dynamic graph where any link between two sensors represents a broken relationship.

Figure 7:
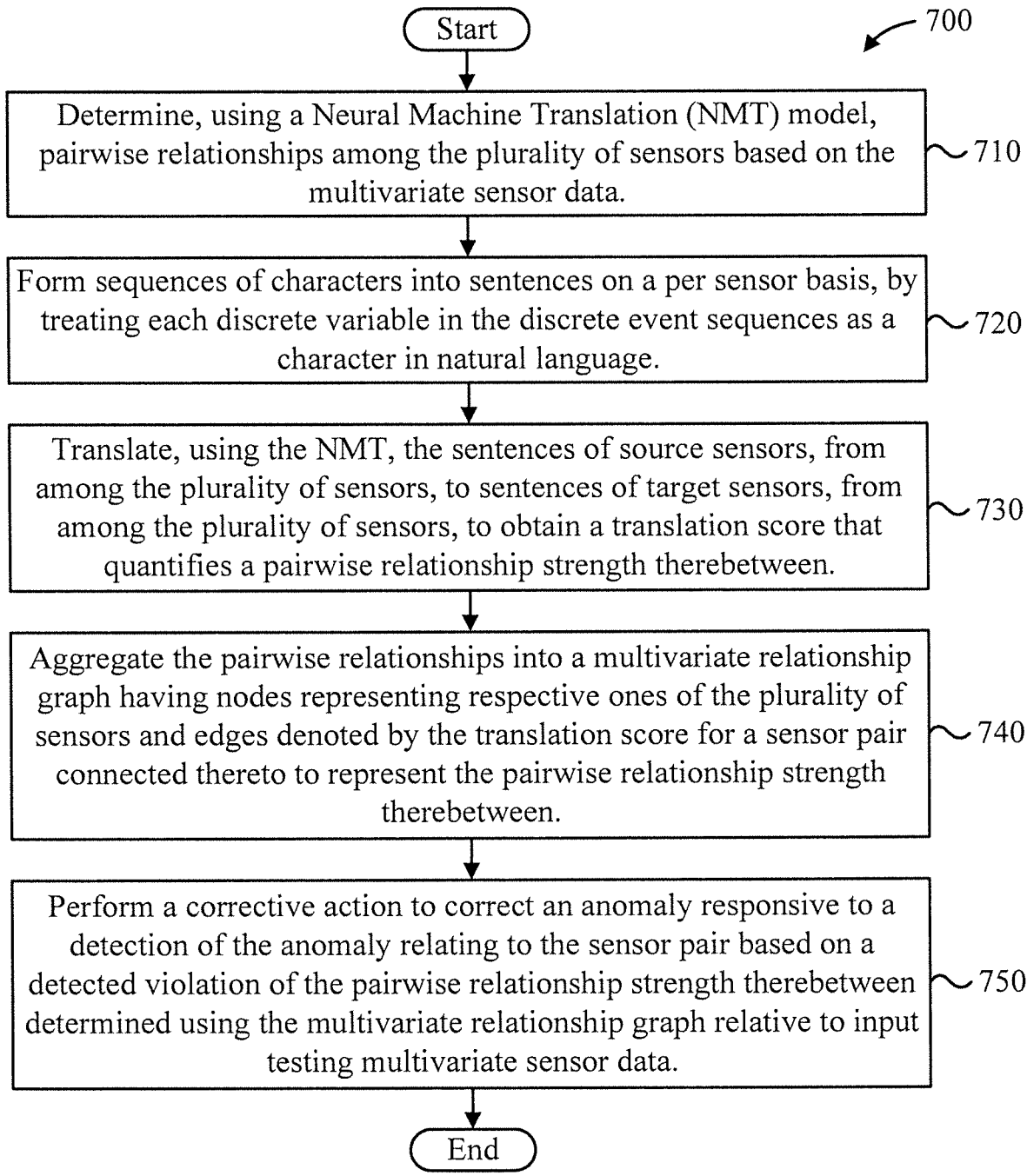
FIG. 7 is a flow diagram showing an exemplary method for anomaly detection and correction, in accordance with an embodiment of the present invention.

FIG. 7 is a flow diagram showing an exemplary method 800 for anomaly detection and correction, in accordance with an embodiment of the present invention.

At block 710, determine, using a Neural Machine Translation (NMT) model, pairwise relationships among the plurality of sensors based on the multivariate sensor data.

At block 720, form sequences of characters into sentences on a per sensor basis, by treating each discrete variable in the discrete event sequences as a character in natural language.

At block 730, translate, using the NMT, the sentences of source sensors, from among the plurality of sensors, to sentences of target sensors, from among the plurality of sensors, to obtain a translation score that quantifies a pairwise relationship strength therebetween.

At block 740, aggregate the pairwise relationships into a multivariate relationship graph having nodes representing respective ones of the plurality of sensors and edges denoted by the translation score for a sensor pair connected thereto to represent the pairwise relationship strength therebetween.

At block 750, perform a corrective action to correct an anomaly responsive to a detection of the anomaly relating to the sensor pair based on a detected violation of the pairwise relationship strength therebetween determined using the multivariate relationship graph relative to input testing multivariate sensor data.

In an embodiment, the corrective action involves automatically disabling the sensor pair having the anomaly relating thereto and enabling a backup sensor pair in place thereof. In another embodiment, the corrective action involves changing a powered state of the sensor pair having the anomaly relating thereto. Of course, other corrective actions can also be taken as readily appreciated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for automatic anomaly detection in a physical hardware system having a plurality of sensors, comprising:
    determining, by a hardware processor using a Neural Machine Translation (NMT) model, pairwise relationships among the plurality of sensors based on the multivariate sensor data including discrete event sequences obtained from the plurality of sensors;
    forming sequences of characters into sentences on a per sensor basis, by treating each discrete variable in the discrete event sequences as a character in natural language;
    translating, by using the NMT, the sentences of source sensors, from among the plurality of sensors, to sentences of target sensors, from among the plurality of sensors, to obtain a translation score that quantifies a pairwise relationship strength therebetween;
    aggregating the pairwise relationships into a multivariate relationship graph having nodes representing respective ones of the plurality of sensors and edges denoted by the translation score for a sensor pair connected thereto to represent the pairwise relationship strength therebetween; and
    performing a corrective action to correct an anomaly responsive to a detection of the anomaly relating to the sensor pair based on a detected violation of the pairwise relationship strength therebetween determined using the multivariate relationship graph relative to input testing multivariate sensor data.

2. The computer-implemented method of claim 1, wherein said translating step uses same parameter setting to train the NMT model among each sensor pair formed from the plurality of sensors.

3. The computer-implemented method of claim 1, wherein a higher translation score implies a stronger relationship between two sensors in the sensor pair from among the plurality of sensors, while a lower score implies a weaker relationship.

4. The computer-implemented method of claim 1, further comprising tracing the detected anomaly through the multivariate relationship graph to determine a root cause of the detected anomaly.

5. The computer-implemented method of claim 1, wherein the pairwise relationships are determined during normal system operation of the physical hardware system.

6. The computer-implemented method of claim 1, wherein an edge weight is denoted by the translation score.

7. The computer-implemented method of claim 1, wherein the pairwise relationship strength denotes a pairwise logical relationship.

8. The computer-implemented method of claim 1, wherein the pairwise strength denotes a pairwise physical relationship.

9. The computer-implemented method of claim 1, wherein the multivariate relationship graph is generated during an offline training phase, and is subsequently used for said performing step in an online testing phase.

10. The computer-implemented method of claim 1, wherein said forming step comprises mapping event records in the discrete event sequences into an alphabet that forms an artificial sensor language.

11. The computer-implemented method of claim 1, further comprising generating the sentences from groups of m words using a sliding window of n words, wherein m and n are user selectable integers, and wherein n>m.

12. The computer-implemented method of claim 1, wherein for two sensor pairs that are similar based on similarity criteria, a single representative sensor pair from among the two sensor pairs is selected with a remaining sensor pair from among the two sensor pairs being ignored.

13. The computer-implemented method of claim 1, wherein the corrective action comprises automatically disabling the sensor pair having the anomaly relating thereto and enabling a backup sensor pair in place thereof.

14. A computer program product for automatic anomaly detection in a physical hardware system having a plurality of sensors, the computer program product comprising a non-transitory computer readable storage medium having program instructions embodied therewith, the program instructions executable by a computer to cause the computer to perform a method comprising:

determining, by a hardware processor using a Neural Machine Translation (NMT) model, pairwise relationships among the plurality of sensors based on the multivariate sensor data including discrete event sequences obtained from the plurality of sensors;

forming sequences of characters into sentences on a per sensor basis, by treating each discrete variable in the discrete event sequences as a character in natural language;

translating, using the NMT, the sentences of source sensors, from among the plurality of sensors, to sentences of target sensors, from among the plurality of sensors, to obtain a translation score that quantifies a pairwise relationship strength therebetween;

aggregating the pairwise relationships into a multivariate relationship graph having nodes representing respective ones of the plurality of sensors and edges denoted by the translation score for a sensor pair connected thereto to represent the pairwise relationship strength therebetween; and performing a corrective action to correct an anomaly responsive to a detection of the anomaly relating to the sensor pair based on a detected violation of the pairwise relationship strength therebetween determined using the multivariate relationship graph relative to input testing multivariate sensor data.

15. The computer program product of claim 14, wherein said translating step uses same parameter setting to train the NMT model among each sensor pair formed from the plurality of sensors.

16. The computer program product of claim 14, wherein a higher translation score implies a stronger relationship between two sensors in the sensor pair from among the plurality of sensors, while a lower score implies a weaker relationship.

17. The computer program product of claim 14, further comprising tracing the detected anomaly through the multivariate relationship graph to determine a root cause of the detected anomaly.

18. The computer program product of claim 14, wherein the pairwise relationships are determined during normal system operation of the physical hardware system.

19. The computer program product of claim 14, wherein an edge weight is denoted by the translation score.

20. A computer processing system for automatic anomaly detection in a physical hardware system having a plurality of sensors, the computer processing system comprising:

a memory device including program code stored thereon;

a hardware processor, operatively coupled to the memory device, and configured to run the program code stored on the memory device to determine, using a Neural Machine Translation (NMT) model, pairwise relationships among the plurality of sensors based on the multivariate sensor data including discrete event sequences obtained from the plurality of sensors;

form sequences of characters into sentences on a per sensor basis, by treating each discrete variable in the discrete event sequences as a character in natural language;

translate, using the NMT, the sentences of source sensors, from among the plurality of sensors, to sentences of target sensors, from among the plurality of sensors, to obtain a translation score that quantifies a pairwise relationship strength therebetween;

aggregate the pairwise relationships into a multivariate relationship graph having nodes representing respective ones of the plurality of sensors and edges denoted by the translation score for a sensor pair connected thereto to represent the pairwise relationship strength therebetween; and perform a corrective action to correct an anomaly responsive to a detection of the anomaly relating to the sensor pair based on a detected violation of the pairwise relationship strength therebetween determined using the multivariate relationship graph relative to input testing multivariate sensor data.

\* \* \* \* \*